(12) United States Patent
Swor (10) Patent No.: US 9,434,450 B1
(45) Date of Patent: Sep. 6, 2016

(54) VIBRATION DAMPENING APPARATUS FOR A BOAT TOWER

(71) Applicant: Loren Swor, Duncan, OK (US)

(72) Inventor: Loren Swor, Duncan, OK (US)

(*) Notice: Subject to any disclaimer, the term of this patent is extended or adjusted under 35 U.S.C. 154(b) by 0 days.

(21) Appl. No.: 14/722,986

(22) Filed: May 27, 2015

(51) Int. Cl.
*B63B 17/00* (2006.01)
*B63B 15/00* (2006.01)
*F16F 7/10* (2006.01)
*B63B 15/02* (2006.01)

(52) U.S. Cl.
CPC .............. *B63B 15/00* (2013.01); *B63B 15/02* (2013.01); *F16F 7/10* (2013.01); *F16F 7/1034* (2013.01); *B63B 2710/00* (2013.01)

(58) Field of Classification Search
CPC ....... B63B 15/00; B63B 15/02; B63B 17/00; B63B 17/0081; B63B 2710/00; B63B 2015/00; B63B 2017/00; B63B 17/04; F16F 7/10; F16F 7/1034
USPC .......................................... 114/253, 343, 364
See application file for complete search history.

(56) References Cited

U.S. PATENT DOCUMENTS

| | | | | |
|---|---|---|---|---|
| 7,234,408 | B1* | 6/2007 | Clemmons | B63B 35/816 114/253 |
| 8,631,754 | B1* | 1/2014 | Sax, Sr. | B63B 17/00 114/253 |
| 2006/0185572 | A1* | 8/2006 | Leseberg | B63B 35/815 114/253 |
| 2009/0320738 | A1* | 12/2009 | Blumberg | B63B 17/00 114/364 |

* cited by examiner

*Primary Examiner* — Daniel V Venne
(74) *Attorney, Agent, or Firm* — Dunlap Codding, P.C.

(57) ABSTRACT

A boat tower, comprising a support frame comprising a first leg having an upper end and a lower end attachable to a first side of a boat, a second leg having an upper end and a lower end attachable to a second side of the boat, and a cross member extending from the upper end of the first leg to the upper end of the second leg; and a vibration dampening apparatus having a first end, a second end, and a longitudinal axis extending from the first end to the second end, and connected to the support frame in a substantially perpendicular relationship to a vertical plane which laterally bisects the cross member between the first leg and the second leg in a way that the vibration dampening apparatus mitigates lateral vibrations of the tower when the first and second legs are attached to the boat.

30 Claims, 10 Drawing Sheets

VIBRATION DAMPENING APPARATUS FOR A BOAT TOWER

BACKGROUND

Many boats have frames or structures extending above the hull of the boat. In general, these and other structures attached to the boat are referred to as boat towers. These frames or structures may be in the form of wake towers, T-top frames, fishing towers, conventional fishing platforms, fly fishing platforms, biminis, or racks, for example.

Wake towers, for example, are used for towing water sport practitioners, such as water skiers, water tube riders, and wakeboarders. Typically, it is desirable for wake towers to be elevated such that the attachment point (i.e., the tow point) for a tow rope for these water sports is elevated. Boat towers may also be used for storage of items, such as boating or sporting equipment. Many boat towers are also utilized as attachment points for boating accessories, such as lights, speakers, biminis, platforms, and sun-shades. Boat towers may also have platforms for multiple uses.

A problem encountered with many boat towers is they vibrate or shake, inducing lateral oscillations of the boat tower, when the boat is in motion. Generally, the higher the elevation of the tower, the higher the elevation of the tow point, the heavier the upper portions of the tower, or the heavier the tower attachments, the greater number or severity of the oscillations experienced. This may cause damage to the tower or to the boat. For example, the vibration may create stress cracks in the joints in the tower. Or the vibration may cause damage to the hull of the boat at the attachment points for the tower. The vibrations may also cause an unpleasant user experience or lowered perception of the quality of the boat tower. Therefore, apparatuses and systems are needed to address vibration/oscillation in boat towers.

DETAILED DESCRIPTION OF EXEMPLARY EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to manufacturing tolerances, measurement error, wear and tear, stresses exerted on various parts, and combinations thereof, for example.

The use of the term "at least one" or "one or more" will be understood to include one as well as any quantity more than one. In addition, the use of the phrase "at least one of X, V, and Z" will be understood to include X alone, V alone, and Z alone, as well as any combination of X, V, and Z.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Figure 1:
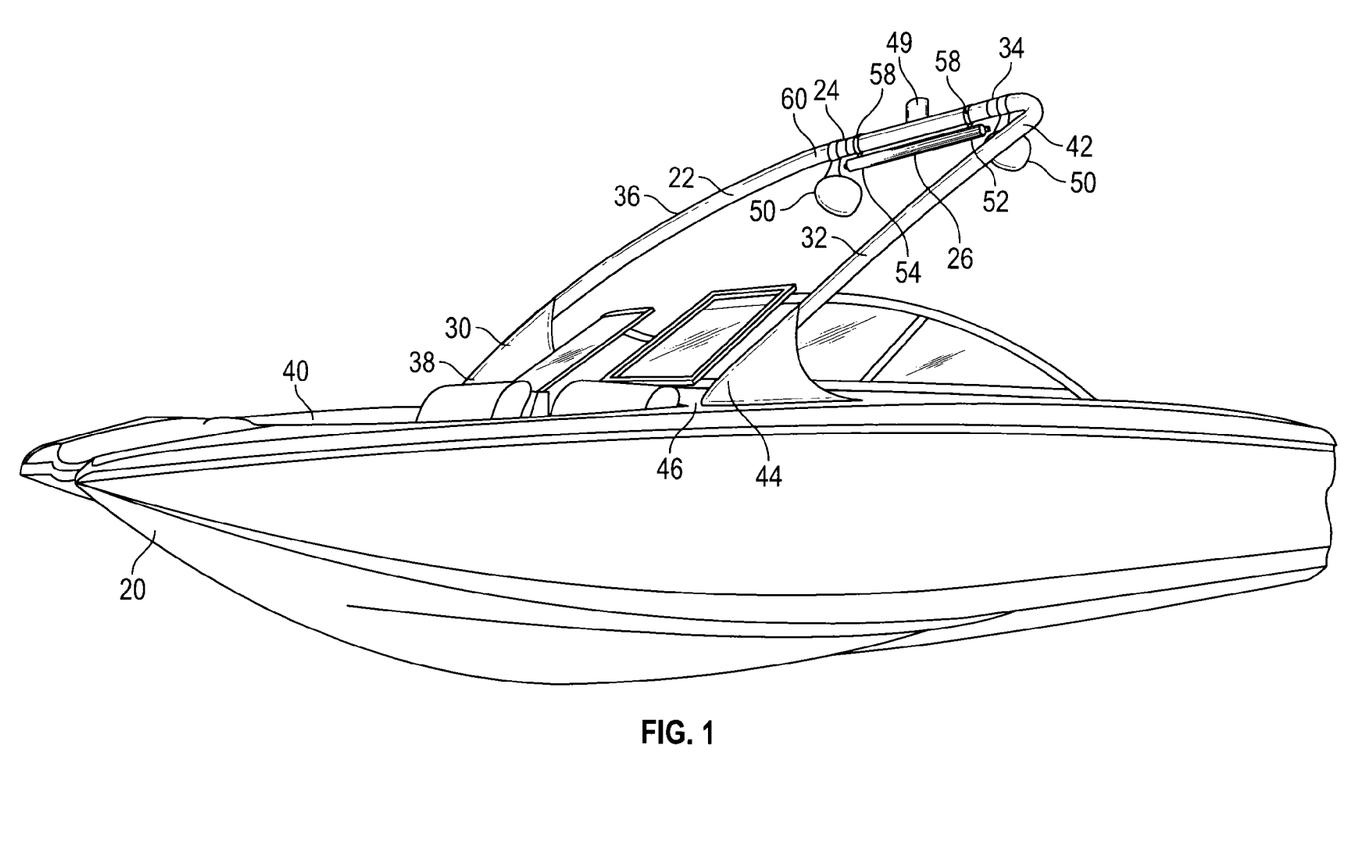
FIG. 1 is a perspective view of an exemplary embodiment of a boat tower in accordance with the present disclosure shown mounted to a boat.
Figure 2:
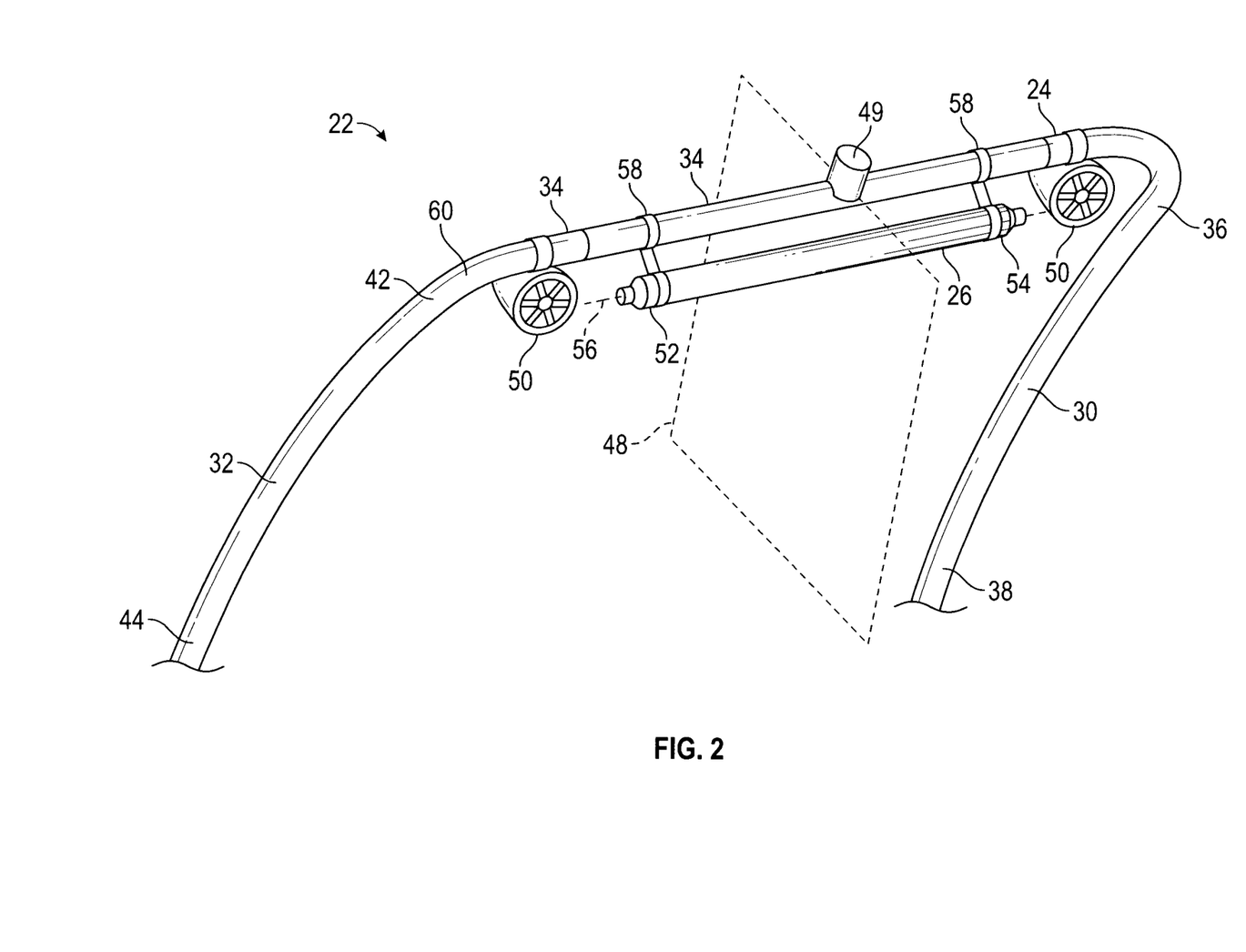
FIG. 2 is a rear perspective view of the boat tower of FIG. 1.

Referring now to the drawings, FIG. 1 illustrates a perspective view of an exemplary embodiment of a boat 20 and a boat tower 22 in accordance with the present disclosure. FIG. 2 illustrates a perspective view of an exemplary embodiment of the boat tower 22 of FIG. 1. The boat tower 22 comprises a support frame 24 and a vibration dampening apparatus 26.

The support frame 24 may comprise a first leg 30, a second leg 32, and a first cross member 34. The first leg 30 has an upper end 36 and a lower end 38; the lower end 38 attachable to a first side 40 of the boat 20. The second leg 32 has an upper end 42 and a lower end 44; the lower end 44 attachable to a second side 46 of the boat 20. The first cross member 34 may extend from the upper end 36 of the first leg 30 to the upper end 42 of the second leg 32 such that the support frame 24 has a vertical plane 48 which laterally bisects the first cross member 34 between the first leg 30 and the second leg 32. In one embodiment, the first cross member 34 is substantially horizontal. In one embodiment, the first cross member 34 is arched.

The first leg 30 and the second leg 32 may be of any length. In one embodiment, the first leg 30 and the second leg 32 are a length such that the cross member 34 is between about three feet and about seven feet above the boat 20 when the boat tower 22 is mounted to the boat 20.

In one embodiment, the first leg 30, the second leg 32, and the first cross member 34 may be constructed with tubular or angular bar, for example. Any one or more of the first leg 30, second leg 32, and the cross member 34 may comprise multiple sections. In one embodiment, welds, bolts, screws, or other suitable fastening mechanisms may be used to connect the components of the support frame 24 to each other and to the boat 20. The support frame 24 may be connected to the first side 40 and second side 46 of the boat 20 at exterior points on the hull, at top points on the hull, and/or at interior points on the hull of the boat 20, including at points on a deck of the boat 20. The support frame 24 may be an integral frame, a frame that is provided as part of a kit, or a pre-existing frame or rack for attachment to the boat 20, and so on. It will be understood that the support frame 24 may be comprised of a greater or smaller number of legs and cross members, and/or may be a singular unit, as long as at least a portion of the support frame 24 is positioned a vertical distance above the hull of the boat 20 when the support frame 24 is mounted to the boat 20. The support frame 24 may be constructed of metal, such as aluminum or steel, or of any suitable material for the use of the boat tower 22.

In one embodiment, the support frame 24 may comprise at least one tow point 49. In one embodiment, at least one tower accessory 50 may be attached to the support frame 24. Nonexclusive examples of accessories 50 include storage racks, carrying racks, lights, speakers, biminis, platforms, rods, and sun-shades.

The vibration dampening apparatus 26 of the boat tower 22 mitigates lateral vibrations of the boat tower 22 when the first leg 30 and second leg 32 are attached to the boat 20. The vibration dampening apparatus 26 has a first end 52, a second end 54, and a longitudinal axis 56 extending from the first end 52 to the second end 54. The vibration dampening apparatus 26 is connected to the support frame 24 so that the longitudinal axis 56 is in a substantially perpendicular relationship to the vertical plane 48 which laterally bisects the cross member 34 between the first leg 30 and the second leg 32. It will be understood that the vibration dampening apparatus 26 may be connected to the support frame 24 with any suitable fastener(s) 58, non-exclusive examples of which include bolts, screws, rivets, clamps, or any other connection method, which are well known in the art.

In one embodiment, the vibration dampening apparatus 26 is connected to the support frame 24 at a distance from the first leg 30 and the second leg 32. In one embodiment, the vibration dampening apparatus 26 may be connected to the support frame 24 at a first distance from the first leg 30 and a second distance from the second leg 32, where the first distance is different from the second distance. In one embodiment, the vibration dampening apparatus 26 may be positioned substantially equidistant between the upper end 36 of the first leg 30 and the upper end 42 of the second leg 32. In one embodiment, the upper end 36 of the first leg 30, the upper end 42 of the second leg 32, and the cross member 34 form an upper portion 60 of the support frame 24, and the vibration dampening apparatus 26 is connected to the upper portion 60 of the support frame 24.

Figure 3:
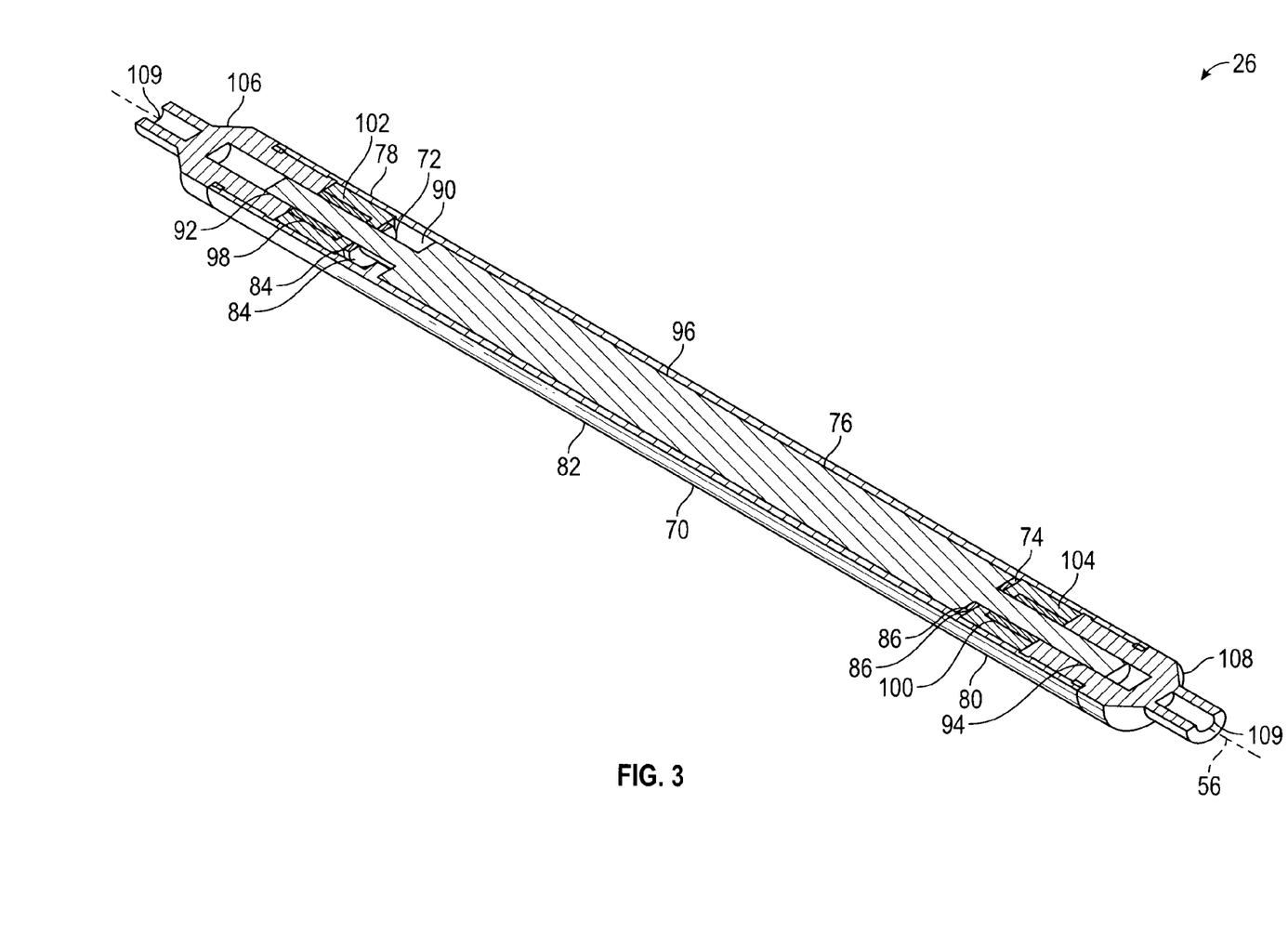
FIG. 3 is a perspective, cross-sectional view of an exemplary vibration dampening apparatus in accordance with the present disclosure.

Turning now to FIG. 3, in one embodiment, the vibration dampening apparatus 26 comprises a tube 70, a first shock damper 72, a second shock damper 74, and a weight 76. The tube 70 has a first end 78, a second end 80, and a length 82 extending between the first end 78 and the second end 80. The first shock damper 72 may be positioned in the tube 70 proximate to the first end 78 of the tube 70, and the second shock damper 74 may be positioned in the tube 70 proximate to the second end 80 of the tube 70. The weight 76 is positioned in the tube 70 in a way to be freely moveable along the length 82 of the tube 70 between the first shock damper 72 and the second shock damper 74.

The weight 76 may be between about eight pounds and about twenty-five pounds. In one embodiment, the weight 76 may be about seventeen pounds. In one embodiment, the weight 76 is freely moveable along the length 82 of the tube 70 a maximum distance of between about one-quarter of an inch and about three inches. In one embodiment, the weight 76 is freely moveable along the length 82 of the tube 70 a maximum distance of about one-quarter of an inch.

Though the weight 76 is shown in FIG. 3 as having a substantially cylindrical shape, the weight 76 may be of any geometric shape that is freely moveable within the tube 70. In one embodiment, the weight 76 is comprised at least in part of a fluid (not shown).

Likewise, it will be understood that the tube 70 may be cylindrical, or may be of any other shape suitable for free movement of the weight 76 within the tube 70. In one embodiment, the tube 70 may have a diameter substantially similar to the diameter of the cross member 34 of the support frame 24.

The first shock damper 72 and the second shock damper 74 absorb the force of the weight 76 as the weight moves in the tube 70 to impact the first shock damper 72 or the second shock damper 74. The first shock damper 72 and the second shock damper may be one or more energy absorption device. In one embodiment, the first shock damper 72 may be at least one first washer 84 and the second shock damper 74 may be at least one second washer 86. In one embodiment, the first shock damper 72 may be at least two first washers 84, and the second shock damper 74 may be at least two second washers 86. In one embodiment, the first washers 84 and second washers 86 may each have a thickness of about one-quarter of an inch. The first washers 84 and the second washers 86 may be made of rubber, nitrile, or any suitable shock-absorbing material.

In one embodiment, a dampening fluid 90 is contained within the tube to assist the first shock damper 72 and the second shock damper 74 in the dampening process. The dampening fluid 90 may be air, other gas, or combination of gases, or other fluids, for example, oil-based fluids.

In one embodiment, the weight 76 has a first end portion 92 with a first diameter, a second end portion 94 with a second diameter, and an intermediate portion 96 between the first end portion 92 and the second end portion 94, with a third diameter larger than the first diameter and the second diameter. The first end portion 92 may be slidably disposed through the first shock damper 72 and the second end portion 94 may be slideably disposed through the second shock damper 74 such that the intermediate portion 96 is moveable between the first shock damper 72 and the second shock damper 74. The intermediate portion 96 may impact the first shock damper 72 and the second shock damper 74 when the intermediate portion 96 moves between the first shock damper 72 and the second shock damper 74.

In one embodiment, the vibration dampening apparatus 26 may further comprise a first bearing 98 positioned between the first end 78 of the tube 70 and the first shock damper 72 to slideably support the first end portion 92 of the weight 76 and a second bearing 100 positioned between the second end 80 of the tube 70 and the second shock damper 74 to slideably support the second end portion 94 of the weight 76. The first and second bearings 98, 100 may be linear bearings. Additionally, one or more adaptors, such as a first adaptor 102 and a second adaptor 104, may be used to fit the first and second bearings 98, 100 to the tube 70 and/or to protect the first and second bearings 98, 100 from forces of the weight 76 when the weight 76 impacts the first and second shock dampers 72, 74.

In one embodiment, the vibration dampening apparatus 26 may further comprise a first end cap 106 and a second end cap 108. In one embodiment, the vibration dampening apparatus 26 may be connected to the support frame 24 at the first end cap 106 and the second end cap 108. In one embodiment, the first end cap 106 and the second end cap 108 may each have a recess 109 for receiving the fastener 58 for attachment of the vibration dampening apparatus 26 to the support frame 24. In one embodiment, the first end cap 106 and the second end cap 108 may slideably receive the first end portion 92 and the second end portion 94 of the weight 76.

Figure 4:
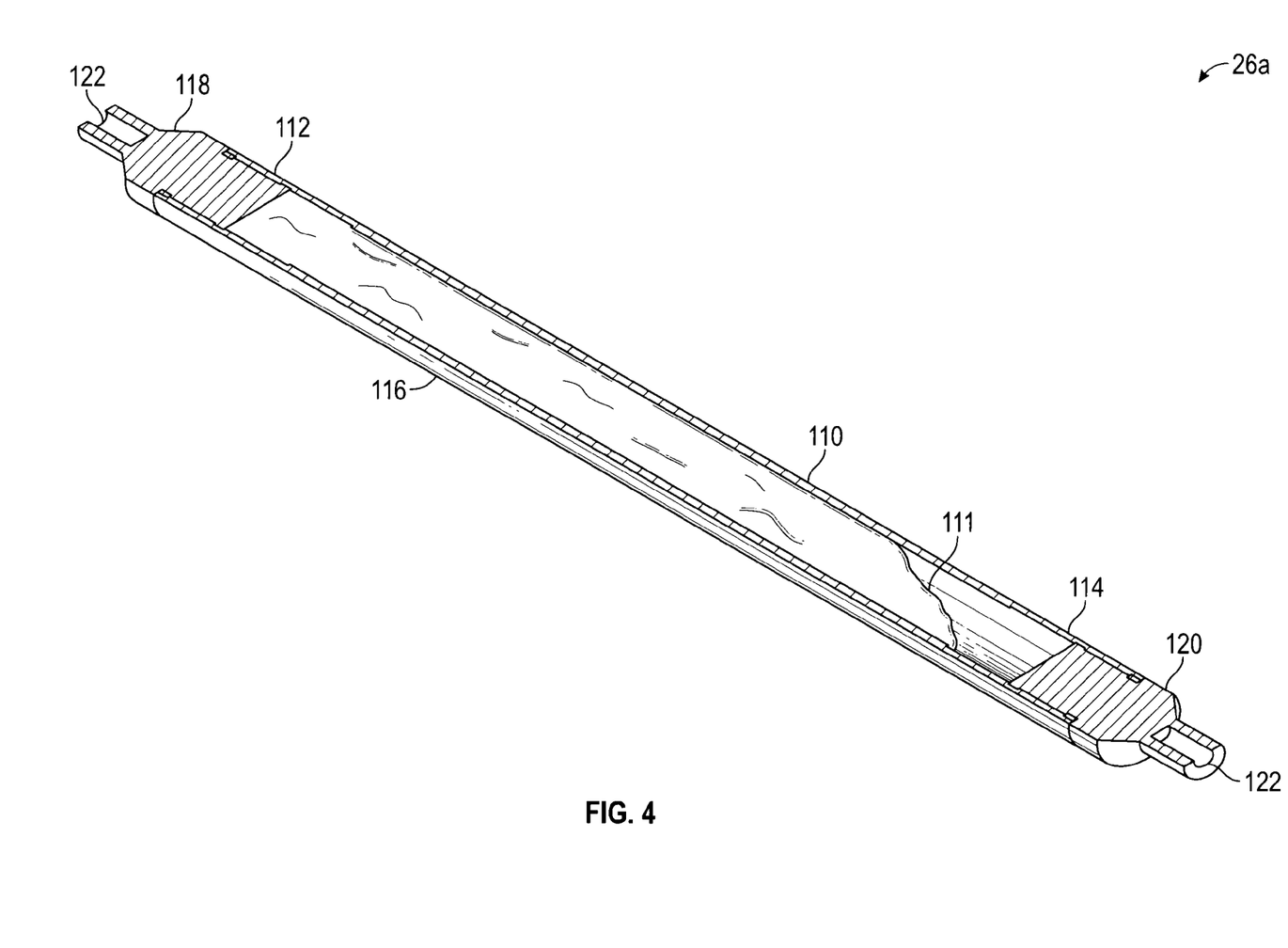
FIG. 4 is a perspective, cross-sectional view of another exemplary vibration dampening apparatus in accordance with the present disclosure.

FIG. 4 illustrates another embodiment of a vibration dampener apparatus 26a. The vibration dampening apparatus 26a may comprise a tube 110 and a liquid weight 111 inside the tube 110. The tube 110 has a first end 112, a second end 114, and a length 116 extending between the first end 112 and the second end 114. The liquid weight 111 may be freely moveable along the length 116 of the tube 110 between the first end 112 and the second end 114 of the tube 110. In one embodiment, the liquid weight 111 may have a freezing point below zero degrees Celsius. In one embodiment, the liquid weight 111 may fill a portion of the tube 110, while the remainder of the tube 110 may contain air or other gas(es), or may contain a vacuum. In one embodiment, the liquid weight 111 may fill approximately 70% to approximately 90% of the tube 110. In one embodiment, the liquid weight 111 may be between about eight pounds and about twenty-five pounds. In one embodiment, the liquid weight 111 may be about seventeen pounds.

In one embodiment, the vibration dampening apparatus 26a may further comprise a first end cap 118 and a second end cap 120. In one embodiment, the first end cap 118 and the second end cap 120 may each have a recess 122 for receiving the fastener 58 for attachment of the vibration dampening apparatus 26a to the support frame 24. It will be understood that the vibration dampening apparatus 26a may be attached to the support frame 24 in other manners, as is well known in the art.

Likewise, it will be understood that the tube 110 may be cylindrical, or may be of any other shape suitable for free movement of the liquid weight 111 within the tube 110. In one embodiment, the tube 110 may have a diameter substantially similar to the diameter of the cross member 34 of the support frame 24.

Figure 5:
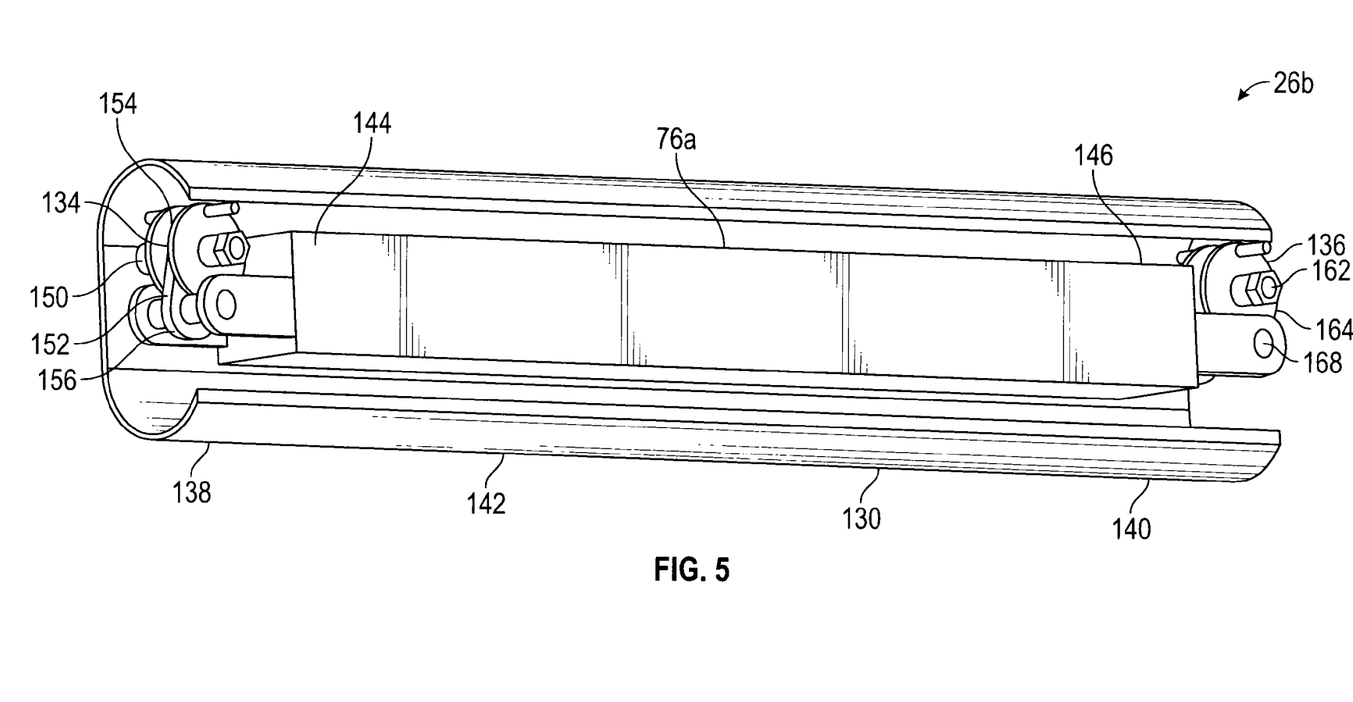
FIG. 5 is a partial cross-sectional view of another embodiment of an exemplary vibration dampening apparatus in accordance with the present disclosure.

FIG. 5 illustrates another embodiment of a vibration dampener apparatus 26b. The vibration dampening apparatus 26b may comprise a tube 130, a weight 76a, a first rocker apparatus 134, and a second rocker apparatus 136. The tube 130 has a first end 138, a second end 140, and a tube length 142 extending between the first end 138 and the second end 140 of the tube 130. The weight 76a has a first end 144 and a second end 146 and is positioned within the tube 130. The first rocker apparatus 134 is positioned proximate to the first end 138 of the tube 130. The first rocker apparatus 134 may comprise a first pin 150 connected to the first end 138 of the tube 130 and a first connector 152 having a proximate end 154 rotatable about the first pin 150 and a distal end 156 attached to the first end 144 of the weight 76a. The second rocker apparatus 136 is positioned proximate to the second end 140 of the tube 130. The second rocker apparatus 136 may comprise a second pin 162 attached to the second end 140 of the tube 130 and a second connector 164 having a proximate end 166 rotatable about the second pin 162 and a distal end 168 connected to the second end 146 of the weight 76a such that the weight 76a is freely movable within the tube 130.

Figure 6:
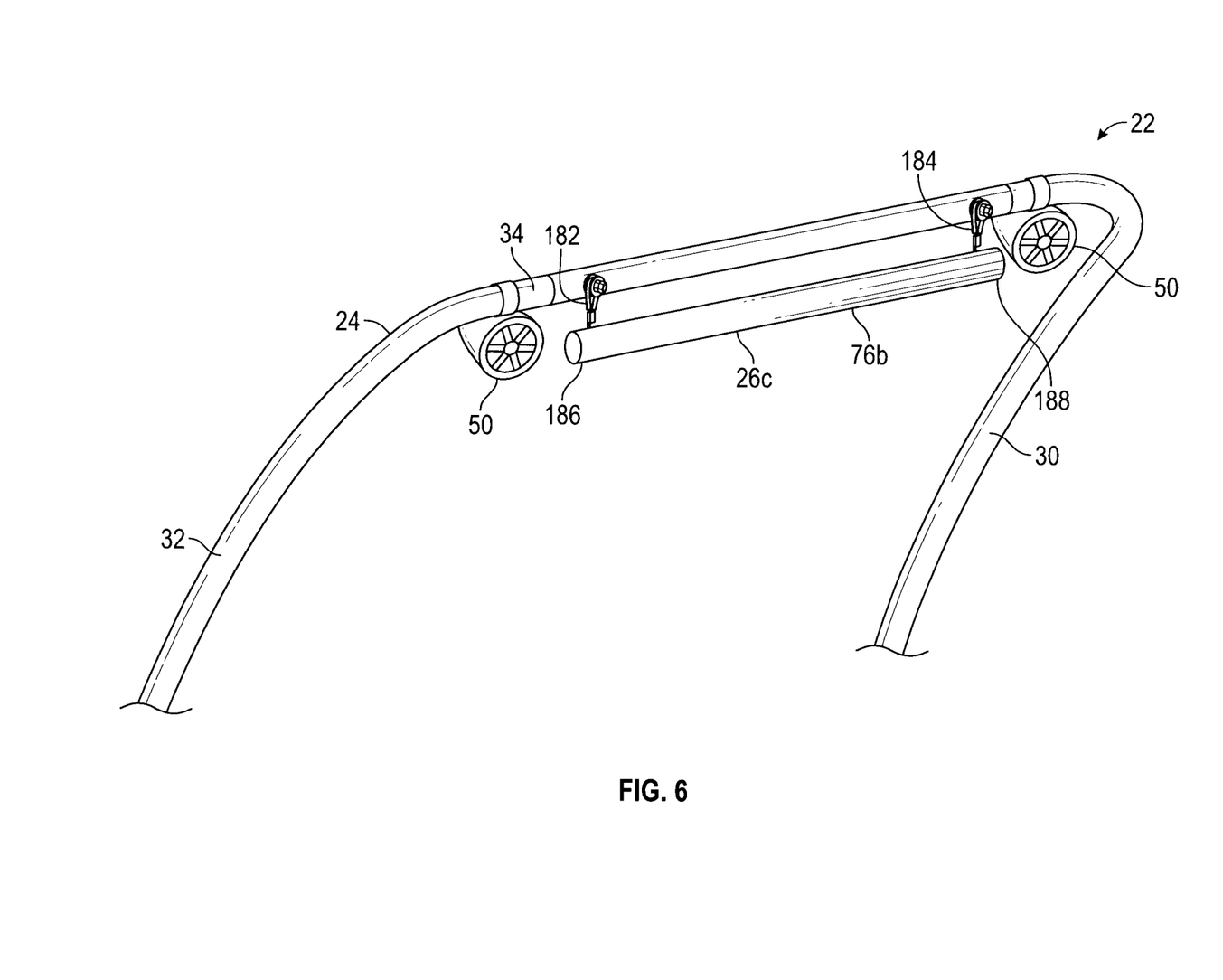
FIG. 6 is a perspective view of another exemplary embodiment of a boat tower in accordance with the present disclosure.
Figure 7:
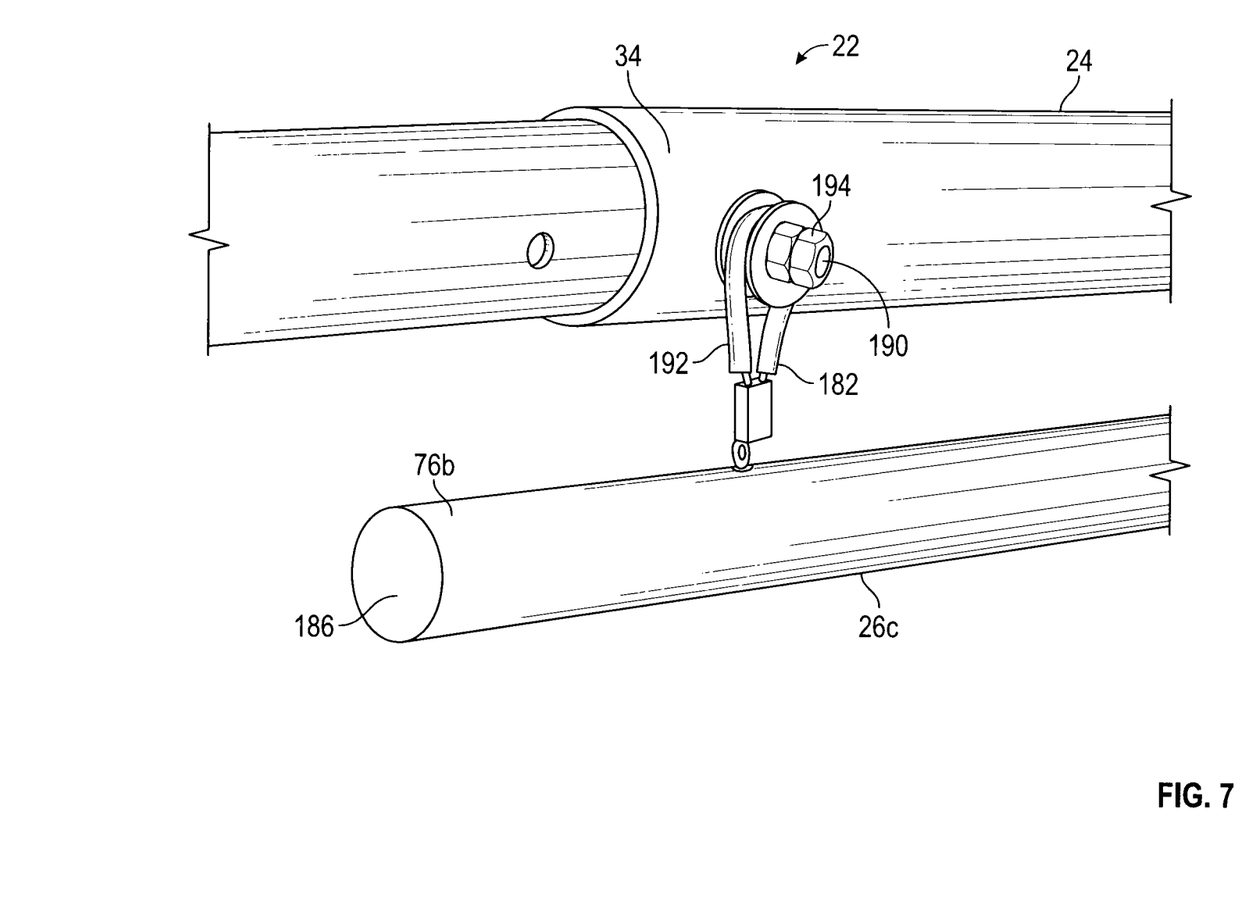
FIG. 7 is a perspective view of a portion of the boat tower of FIG. 6.

In another embodiment, illustrated in FIGS. 6 and 7, a vibration dampener apparatus 26c comprises a weight 76b, a first connector 182, and a second connector 184. The weight 76b has a first end 186 and a second end 188 and is positioned substantially perpendicular to the vertical plane 48 which laterally bisects the cross member 34 between the first leg 30 and the second leg 32. The weight 76b is moveably connectable to the cross member 34 with the first connector 182 and the second connector 184 such that the weight 76b is moveable in a lateral direction in relation to the vertical plane 48. In one embodiment, the weight 76b is moveably suspended from the cross member 34 by the first connector 182 and the second connector 184.

In one embodiment, the first connector 182 and/or the second connector 184 may slow the movement of the weight 76b. For example, in one embodiment the first connector 182 and the second connector 184 each comprise a member 190 connectable to the cross member 34, a loop 192 positionable over the member 190 and connected to the weight 76b. The member 190 may have a holding device 194, such as washers and nuts, to reduce and/or slow the amount of rotation of the loop 192 around the member 190 when the holding device 194 is engaged, and thus reduce and/or slow the amount of movement of the weight 76b. The first connector 182 and the second connector 184 may provide energy absorption. It will be understood that other types of connectors may be used to connect the weight 76b to the cross member 34.

Figure 8:
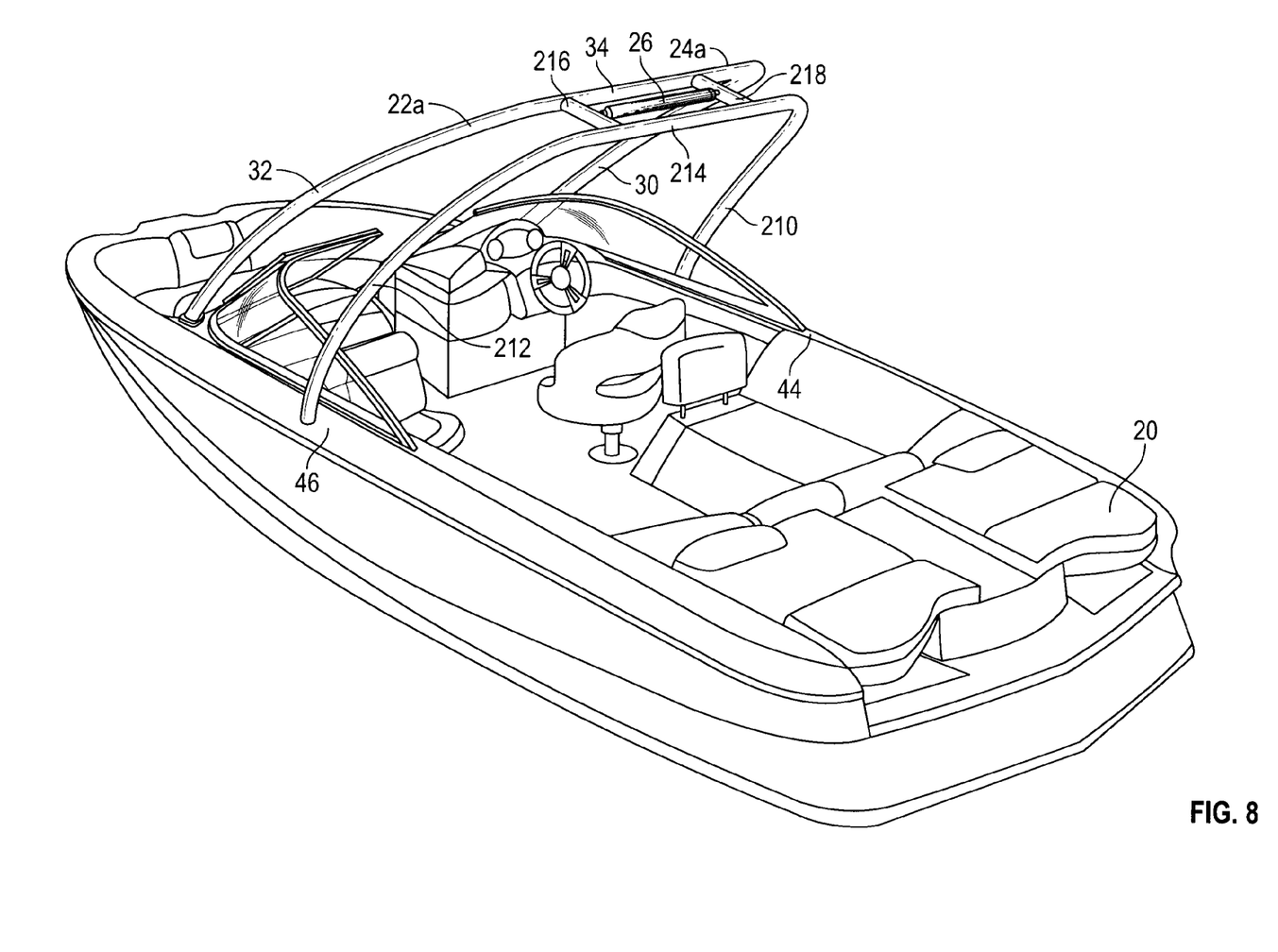
FIG. 8 is a perspective view of another exemplary embodiment of a boat tower in accordance with the present disclosure shown mounted to a boat.
Figure 9:
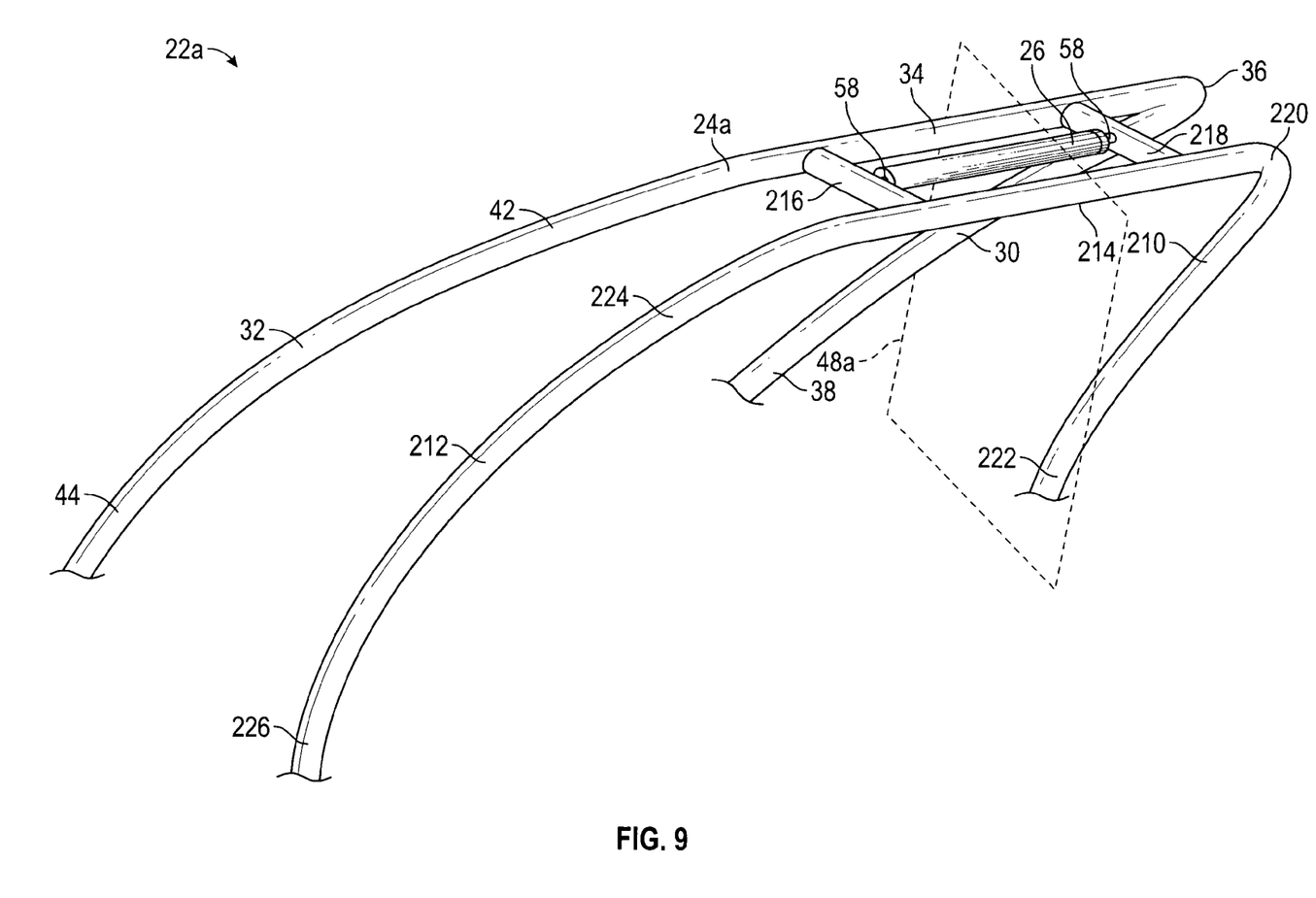
FIG. 9 is a perspective view of an exemplary embodiment of the boat tower of FIG. 8.

FIGS. 8 and 9 illustrate another embodiment of the boat 20 and a boat tower 22a constructed in accordance with the inventive concepts disclosed herein. The boat tower 22a is substantially similar to the boat tower 22, except as described herein below. In one embodiment, the boat tower 22a may comprise a support frame 24a comprising the first leg 30, the second leg 32, and the substantially horizontal first cross member 34. The support frame 24a may also comprise a third leg 210, a fourth leg 212, a substantially horizontal second cross member 214, and at least two connecting members 216, 218. The third leg 210 has an upper end 220 and a lower end 222 attachable to the boat 20. The fourth leg 212 has an upper end 224 and a lower end 226 attachable to the boat 20. The second cross member 214 may extend from the upper end 220 of the third leg 210 to the upper end 224 of the fourth leg 212. The two connecting members 216, 218 may extend from the first cross member 34 to the second cross member 214. In one embodiment, as shown, the vibration dampening apparatus 26 is connected to the connecting members 216, 218, such as with the fasteners 58.

The support frame 24a has a vertical plane 48a which laterally bisects at least one of the first cross member 34 between the first leg 30 and the second leg 32, and the second cross member 214 between the third leg 210 and the fourth leg 212. The vibration dampening apparatus 26 is connected to the support frame 24a in a substantially perpendicular relationship to the vertical plane 48a.

Figure 10:
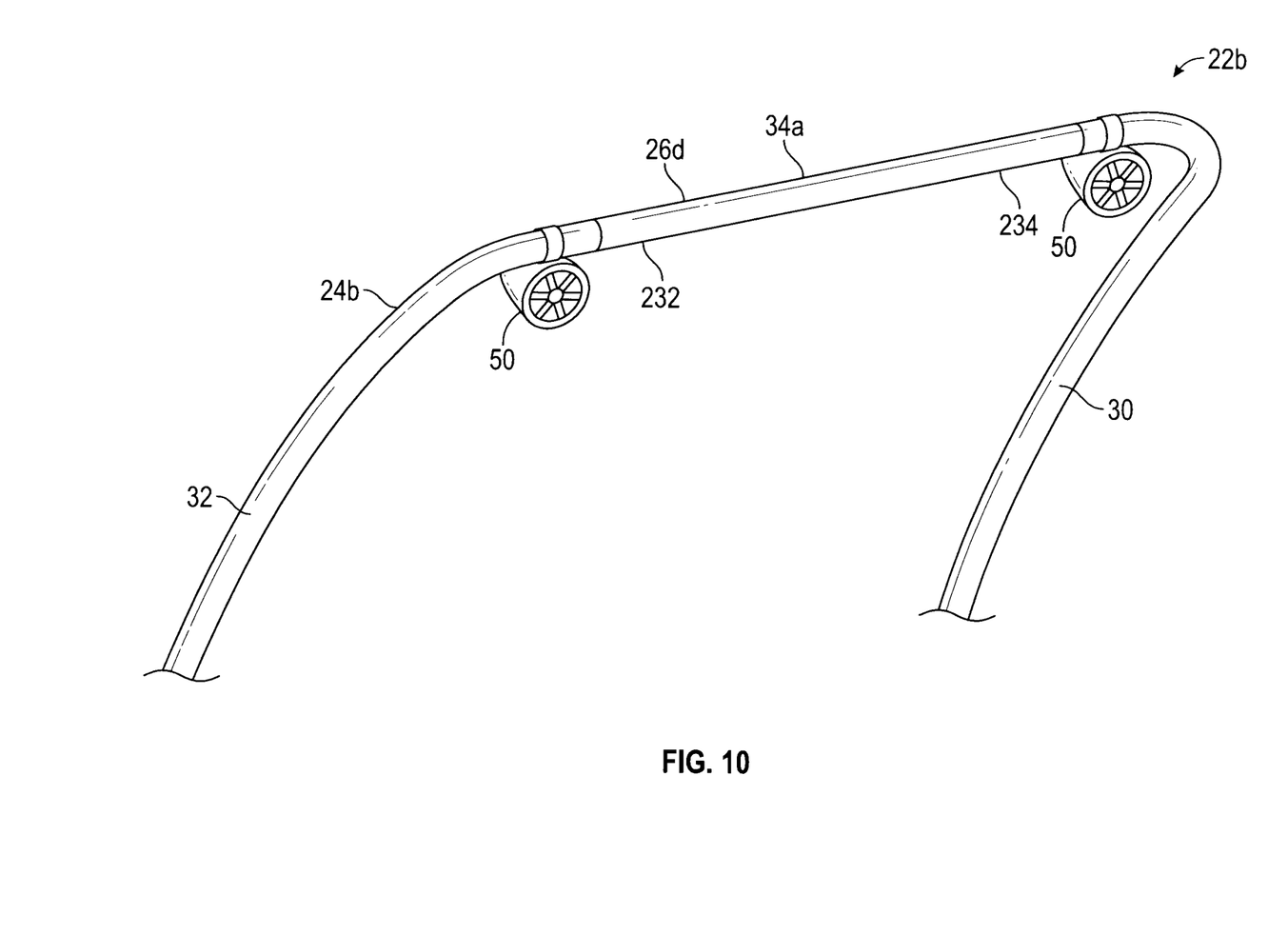
FIG. 10 is a perspective view of an exemplary embodiment of a boat tower in accordance with the present disclosure.

FIG. 10 illustrates a perspective view of an exemplary embodiment of a boat tower 22b in accordance with the present disclosure. The boat tower 22b is substantially similar to the boat tower 22, except as described herein below. As shown in FIG. 10, in one embodiment, the boat tower 22b may comprise support frame 24b having the first leg 30, the second leg 32, and a cross member 34a extending from the upper end 36 of the first leg 30 to the upper end 42 of the second leg 32. The cross member 34a may comprise a vibration dampening apparatus 26d. The vibration dampening apparatus 26d may have a first end 232, a second end 234, and a length extending between the first end 232 and the second end 234. The vibration dampening apparatus 26d mitigates lateral vibrations of the boat tower 22b when the first and second legs 30, 32 are attached to the boat 20.

It will be understood that any of the embodiments of the vibration dampening apparatus 26, 26a, 26b, 26c, or combinations thereof, may be utilized. It will be further understood that any of the embodiments of the vibration dampening apparatus 26, 26a, 26b, 26c, 26d, or combinations thereof, may be incorporated within the support frame 24a, such as within, or in place of, or in place of part of, the second cross member 214 described in conjunction with FIGS. 8-9.

Returning now to FIGS. 1-3, an example of one embodiment of the boat tower 22 in use in accordance with the present disclosure will be described. As the boat 20 moves through water, the boat tower 22 may begin to vibrate such that the boat tower 22 moves laterally back and forth in relation to the forward movement of the boat 20. As the boat 20 moves over swells and wakes in the water, the lateral vibration may increase. The height and weight of the support frame 24 of the boat tower 22, as well as the weight of accessories 50 and/or equipment attached to the boat tower 22, may increase the lateral vibrations. Failing to decrease the vibrations may result in damage to, or failure of, the support frame 24 and the boat 20, such as at attachment points of the support frame 24 to the boat 20.

The vibration dampening apparatus 26 is connected to the support frame 24 in a substantially perpendicular relationship to the vertical plane 48 which laterally bisects the cross member 34 between the first leg 30 and the second leg 32 of the support frame 24. In other words, the vibration dampening apparatus 26 is in a substantially perpendicular relationship to the forward movement of the boat 20 and in a substantially parallel relationship to the direction of lateral movement of the support frame 24 caused by the vibrations. Thus, the vibration dampening apparatus 26 mitigates lateral vibrations of the boat tower 22.

For example, as applied to the embodiment shown in FIG. 3, as the boat tower 22 vibrates laterally, the weight 76 inside the tube 70 of the vibration dampening apparatus 26 moves freely laterally between the first end 78 of the tube 70 and the second end 80 of the tube 70. The weight 76 dampens the vibrations, such that the vibrations are decreased in intensity and/or frequency. The first shock damper 72 and/or the second shock damper 74 may also dampen the intensity and/or frequency of the lateral vibrations of the boat tower 22. The kinetic energy of the mass of the laterally moving weight 76 may be absorbed by the first shock damper 72 and/or the second shock damper 74. The kinetic energy of the mass of the laterally moving weight 76 may be translated at least in part into dissipating heat energy.

Of course, it will be understood that the vibration dampening apparatus 26 may work in other ways, or using other combinations of components, such as springs, pistons, fluid dampeners, and so on, as long as the vibration dampening apparatus 26, 26a, 26b, 26c, 26d works to counter-act the vibrations of the boat tower 22, 22a, 22b.

While several embodiments of the inventive concepts have been described for purposes of this disclosure, it will be understood that numerous changes may be made which will readily suggest themselves to those skilled in the art and which are accomplished within the spirit of the inventive concepts disclosed and as defined in the appended claims.

What is claimed is:

1. A boat tower, comprising:
    a support frame comprising a first leg, a second leg, and a cross member, the first leg having an upper end and a lower end, the lower end attachable to a first side of a boat, the second leg having an upper end and a lower end, the lower end attachable to a second side of the boat, the cross member extending from the upper end of the first leg to the upper end of the second leg; and
    a vibration dampening apparatus having a first end, a second end, and a longitudinal axis extending from the first end to the second end, the vibration dampening apparatus connected to the support frame in a substantially perpendicular relationship to a vertical plane which laterally bisects the cross member between the first leg and the second leg in a way that the vibration dampening apparatus mitigates lateral vibrations of the tower when the first and second legs are attached to the boat.

2. The boat tower of claim 1, wherein the vibration dampening apparatus is connected to the support frame at a distance from the first leg and the second leg.

3. The boat tower of claim 1, wherein the upper end of the first leg, the upper end of the second leg, and the cross member form an upper portion of the support frame, and wherein the vibration dampening apparatus is connected to the upper portion of the support frame.

4. The boat tower of claim 3, wherein the vibration dampening apparatus is positioned substantially equidistant between the upper end of the first leg and the upper end of the second leg.

5. The boat tower of claim 1, wherein the cross member is a first substantially horizontal cross member and wherein the support frame further comprises:
    a third leg having an upper end and a lower end attachable to the boat,
    a fourth leg having an upper end and a lower end attachable to the boat,
    a substantially horizontal second cross member extending from the upper end of the third leg to the upper end of the fourth leg, and
    at least two connecting members extending from the first cross member to the second cross member;
    wherein the vibration dampening apparatus is connected to the connecting members.

6. The boat tower of claim 1, wherein the vibration dampening apparatus comprises:
    a tube having a first end, a second end, and a length extending between the first end and the second end;
    a first shock damper positioned in the tube proximate to the first end of the tube;
    a second shock damper positioned in the tube proximate to the second end of the tube; and a weight positioned in the tube in a way to be freely moveable along the length of the tube between the first shock damper and the second shock damper.

7. The boat tower of claim 6, wherein the weight is between about eight and about twenty-five pounds.

8. The boat tower of claim 6, wherein the weight is freely moveable along the length of the tube a maximum distance of between about one-quarter of an inch and about three inches.

9. The boat tower of claim 6, wherein the first shock damper is at least one energy absorption device and the second shock damper is at least one energy absorption device.

10. The boat tower of claim 6, wherein the first shock damper is at least one first washer and the second shock damper is at least one second washer.

11. The boat tower of claim 6, wherein the weight has a first end portion with a first diameter, a second end portion with a second diameter, and an intermediate portion between the first end portion and the second end portion, with a third diameter larger than the first diameter and the second diameter, and wherein the first end portion is slidably disposed through the first shock damper and the second end portion is slideably deposed through the second shock damper such that the intermediate portion is moveable between the first shock damper and the second shock damper.

12. The boat tower of claim 6, wherein the vibration dampening apparatus further comprises:
  a first bearing positioned between the first end of the tube and the first shock damper to slideably support the first end portion; and
  a second bearing positioned between the second end of the tube and the second shock damper to slideably support the second end portion.

13. The boat tower of claim 12, wherein the tube, the first bearing, and the second bearing share a longitudinal axis.

14. The boat tower of claim 1, wherein the vibration dampening apparatus comprises:
  a tube having a first end, a second end, and a length extending between the first end and the second end; and
  a liquid weight positioned in the tube in a way to be freely moveable along the length of the tube between the first end and the second end.

15. The boat tower of claim 1, wherein the vibration dampening apparatus comprises:
  a tube having a first end, a second end, and a tube length extending between the first end and the second end;
  a weight positioned within the tube, the weight having a first end and a second end;
  a first rocker apparatus positioned proximate to the first end of the tube, the first rocker apparatus comprising:
    a first pin attached to the first end of the tube; and
    a first connector having a proximate end rotatable about the first pin and a distal end attached to the first end of the weight; and
  a second rocker apparatus positioned proximate to the second end of the tube, the second rocker apparatus comprising:
    a second pin attached to the second end of the tube; and
    a second connector having a proximate end rotatable about the second pin and a distal end attached to the second end of the weight such that the weight is freely movable within the tube.

16. A vibration dampening apparatus for a boat tower, comprising:

a tube having a first end, a second end, and a tube length extending between the first end and the second end;
a first shock damper positioned in the tube proximate to the first end of the tube;
a second shock damper positioned in the tube proximate to the second end of the tube; and
a weight positioned in the tube in a way to be freely moveable along the length of the tube, the weight having a first end portion with a first diameter, a second end portion with a second diameter, and an intermediate portion between the first end portion and the second end portion, with a third diameter larger than the first diameter and the second diameter, and wherein the first end portion is slidably disposed through the first shock damper and the second end portion is slideably deposed through the second shock damper such that the intermediate portion is moveable between the first shock damper and the second shock damper.

17. The vibration dampening apparatus of claim 16, further comprising:
  a first bearing positioned between the first end of the tube and the first shock damper to slideably support the first end portion; and
  a second bearing positioned between the second end of the tube and the second shock damper to slideably support the second end portion.

18. The vibration dampening apparatus of claim 16, wherein the weight is between about eight and about twenty-five pounds.

19. The vibration dampening apparatus of claim 18, wherein the weight is freely moveable along the length of the tube a maximum distance of between about one-quarter of an inch and about three inches.

20. The vibration dampening apparatus of claim 16, wherein the first shock damper is at least one first washer and the second shock damper is at least one second washer.

21. A boat tower, comprising:
  a support frame comprising a first leg, a second leg, and a cross member, the first leg having an upper end and a lower end, the lower end attachable to a first side of a boat, the second leg having an upper end and a lower end, the lower end attachable to a second side of the boat, the cross member extending from the upper end of the first leg to the upper end of the second leg, wherein the cross member comprises a vibration dampening apparatus having a first end and a second end and a length extending from the first end to the second end, such that the vibration dampening apparatus mitigates lateral vibrations of the boat tower when the first and second legs are attached to the boat.

22. The boat tower of claim 21, wherein the vibration dampening apparatus comprises:
  a first shock damper positioned in the vibration dampening apparatus proximate to the first end of the vibration dampening apparatus;
  a second shock damper positioned in the vibration dampening apparatus proximate to the second end of the vibration dampening apparatus; and
  a weight positioned in the vibration dampening apparatus in a way to be freely moveable along the length of the vibration dampening apparatus between the first shock damper and the second shock damper.

23. The boat tower of claim 22, wherein the weight is between about eight and about twenty-five pounds.

24. The boat tower of claim 22, wherein the weight is freely moveable along the length of the vibration dampening apparatus a maximum distance of between about one-quarter of an inch and about three inches.

25. The boat tower of claim 22, wherein the first shock damper is at least one energy absorption device and the second shock damper is at least one energy absorption device.

26. The boat tower of claim 22, wherein the first shock damper is at least one first washer and the second shock damper is at least one second washer.

27. The boat tower of claim 22, wherein the weight has a first end portion with a first diameter, a second end portion with a second diameter, and an intermediate portion between the first end portion and the second end portion, with a third diameter larger than the first diameter and the second diameter, and wherein the first end portion is slidably disposed through the first shock damper and the second end portion is slideably deposed through the second shock damper such that the intermediate portion is moveable between the first shock damper and the second shock damper.

28. The boat tower of claim 22, wherein the vibration dampening apparatus further comprises:
    a first bearing positioned between the first end of the vibration dampening apparatus and the first shock damper to slideably support the first end portion; and
    a second bearing positioned between the second end of the vibration dampening apparatus and the second shock damper to slideably support the second end portion.

29. The boat tower of claim 28, wherein the vibration dampening apparatus, the first bearing, and the second bearing share a longitudinal axis.

30. The boat tower of claim 21, wherein the vibration dampening apparatus comprises:
    a liquid weight positioned in the vibration dampening apparatus in a way to be freely moveable along the length of the vibration dampening apparatus between the first end and the second end of the vibration dampening apparatus.

\* \* \* \* \*